United States Patent
Asai

(10) Patent No.: US 11,867,902 B2
(45) Date of Patent: Jan. 9, 2024

(54) DISPLAY DEVICE, HEAD-UP DISPLAY, MOVING BODY, AND LIGHT GUIDE PANEL

(71) Applicant: Panasonic Intellectual Property Management Co., Ltd., Osaka (JP)

(72) Inventor: Yosuke Asai, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 115 days.

(21) Appl. No.: 17/393,667

(22) Filed: Aug. 4, 2021

(65) Prior Publication Data
US 2021/0364795 A1 Nov. 25, 2021

Related U.S. Application Data

(63) Continuation of application No. PCT/JP2019/047204, filed on Dec. 3, 2019.

(30) Foreign Application Priority Data

Feb. 28, 2019 (JP) .................. 2019-036254

(51) Int. Cl.
*G02B 27/01* (2006.01)
*B60R 1/00* (2022.01)
(Continued)

(52) U.S. Cl.
CPC .......... *G02B 27/0101* (2013.01); *B60K 35/00* (2013.01); *B60R 1/001* (2013.01);
(Continued)

(58) Field of Classification Search
CPC ................................................ G02B 27/0101
See application file for complete search history.

(56) References Cited

U.S. PATENT DOCUMENTS 5,359,691 A * 10/1994 Tai ..................... G02F 1/13362
362/561
2011/0044582 A1 * 2/2011 Travis ................. G02B 5/045
359/641

(Continued)

FOREIGN PATENT DOCUMENTS

JP       6-324217      11/1994
JP       2011-90832    5/2011
(Continued)

OTHER PUBLICATIONS

Translation of International Preliminary Report on Patentability and Written Opinion of the International Searching Authority dated Aug. 25, 2021 in International (PCT) Application No. PCT/JP2019/047204.

(Continued)

*Primary Examiner* — Nan-Ying Yang
(74) *Attorney, Agent, or Firm* — Wenderoth, Lind & Ponack, L.L.P.

(57) ABSTRACT

A display device includes light sources that emit light, a display panel that displays an image, and a light guide panel that guides the light emitted from the light sources to the display panel. The light guide panel includes an incident surface facing the light sources, an emission surface facing the display panel, a first reflective surface facing the incident surface, and a second reflective surface facing the emission surface. The first reflective surface has a concave shape that reflects light so that the reflected light becomes closer to parallel light when viewed in a facing direction of the display panel and the light guide panel in the light guide panel, is tilted at an angle larger than 0 degrees with respect to the incident surface, and intersects the second reflective surface at an angle smaller than 90 degrees.

15 Claims, 8 Drawing Sheets

(51) Int. Cl.
*B60K 35/00* (2006.01)
*F21V 8/00* (2006.01)

(52) U.S. Cl.
CPC .... *G02B 6/0011* (2013.01); *G02B 2027/0181* (2013.01); *G02B 2027/0196* (2013.01)

(56) References Cited

U.S. PATENT DOCUMENTS

| | | |
|---|---|---|
| 2012/0063166 A1 | 3/2012 | Panagotacos et al. |
| 2012/0106196 A1 | 5/2012 | Cho et al. |
| 2012/0195063 A1* | 8/2012 | Kim ................ G09F 13/18 362/602 |
| 2013/0335821 A1 | 12/2013 | Robinson et al. |
| 2018/0259773 A1 | 9/2018 | Asai |
| 2018/0321553 A1* | 11/2018 | Robinson ............. G02B 6/0053 |
| 2019/0107664 A1 | 4/2019 | Daiku |

FOREIGN PATENT DOCUMENTS

| | | |
|---|---|---|
| JP | 2013-502697 | 1/2013 |
| JP | 2018-18710 | 2/2018 |
| JP | 2018-174139 | 11/2018 |
| WO | 2017/094209 | 6/2017 |

OTHER PUBLICATIONS

International Search Report dated Feb. 18, 2020 in International (PCT) Application No. PCT/JP2019/047204.
Extended European Search Report dated Feb. 28, 2022 in corresponding European Patent Application No. 19916775.0.
Notice of Reasons for Refusal dated Sep. 26, 2023 in corresponding Japanese Patent Application No. 2021-501586, with English language translation.

* cited by examiner

DISPLAY DEVICE, HEAD-UP DISPLAY, MOVING BODY, AND LIGHT GUIDE PANEL

CROSS-REFERENCE TO RELATED APPLICATIONS

This is a continuation application of International Application No, PCT/JP2019/047204, with an international filing date of Dec. 3, 2019, which claims priority of Japanese Patent Application No. 2019-036254 filed on Feb. 28, 2019, the content of which is incorporated herein by reference.

BACKGROUND OF THE INVENTION

1. Technical Field

The present disclosure relates to a display device, a head-up display including the display device, a moving body including the head-up display, and a light guide panel.

2. Description of Related Art

International Publication No. 2017/094209 discloses a head-up display mounted on a vehicle and including a display device. Light (image) output from the head-up display is guided into the eyebox of the occupant (observer) through the windshield.

The display device of the head-up display described in International Publication No. 2017/094209 includes a light source, a transmissive display panel for displaying an image, and a light guide panel for guiding light from a light source to the display panel. The light emitted from the light source enters the inside of the light guide panel through an incident surface of the light s guide panel, is reflected in the light guide panel, and is emitted to the outside of the light guide panel through an emission surface. The light emitted from the light guide panel passes through the display panel and finally reaches the eyebox of the observer.

However, in the case of the display device described in International Publication No. 2017/094209, when viewed in a facing direction of the display panel and the light guide panel, light propagates in the light guide panel while diverging significantly, and is emitted toward the display panel while diverging from the emission surface of the light guide panel. Therefore, the brightness of an image output from the display device and reflected on the windshield is reduced.

SUMMARY

In view of the above, an object of the present disclosure is to output a high-brightness image from, for example, a display device mounted on a head-up display of a vehicle.

According to one aspect of the present disclosure, there is provided a display device including:
 a light source that emits light;
 a display panel that displays an image; and
 a light guide panel that guides light emitted from the light source to the display panel.

The light guide panel includes an incident surface facing the light source, an emission surface facing the display panel, a first reflective surface facing the incident surface, and a second reflective surface facing the emission surface, and
 the first reflective surface has a concave shape that reflects light so that reflected light becomes closer to parallel light when viewed in a facing direction of the display panel and the light guide panel in the light guide panel, is tilted at an angle larger than 0 degrees with respect to the incident surface, and intersects the second reflective surface at an angle smaller than 90 degrees.

According to another aspect of the present disclosure, there is provided a head-up display that has the display device described above.

According to a different aspect of the present disclosure, there is provided a moving body including:
 the head-up display described above; and
 a windshield on which an image output from the head-up display is projected.

According to a further different aspect of the present disclosure, there is provided a light guide panel that guides light emitted from a light source to a display panel.

The light guide panel includes an incident surface as the light source, an emission surface facing the display panel, a first reflective surface facing the incident surface, and a second reflective surface facing the emission surface.

The first reflective surface has a concave shape that reflects light so that reflected light becomes closer to parallel light when viewed in a facing direction of the display panel and the light guide panel in the light guide panel, is tilted at an angle larger than 0 degrees with respect to the incident surface, and intersects the second reflective surface at an angle smaller than 90 degrees.

According to the present disclosure, a high-brightness image can be output, for example, from a display device mounted on a head-up display of a moving body.

DETAILED DESCRIPTION

Hereinafter, an embodiment will be described in detail with reference to the drawings as appropriate. However, description that is detailed more than necessary may be omitted. For example, detailed description of an already well-known matter and redundant description of substantially the same configuration may be omitted. This is to avoid unnecessary redundancy in the description below and to facilitate understanding of those skilled in the art.

Note that the inventor(s) provide the accompanying drawings and the description below so that those skilled in the art can fully understand the present disclosure, and do not intend to limit the subject matter described in claims by these drawings and description.

Hereinafter, a display device according to a plurality of embodiments of the present disclosure will be described with reference to FIGS. 1 to 8.

First Embodiment

Figure 1:
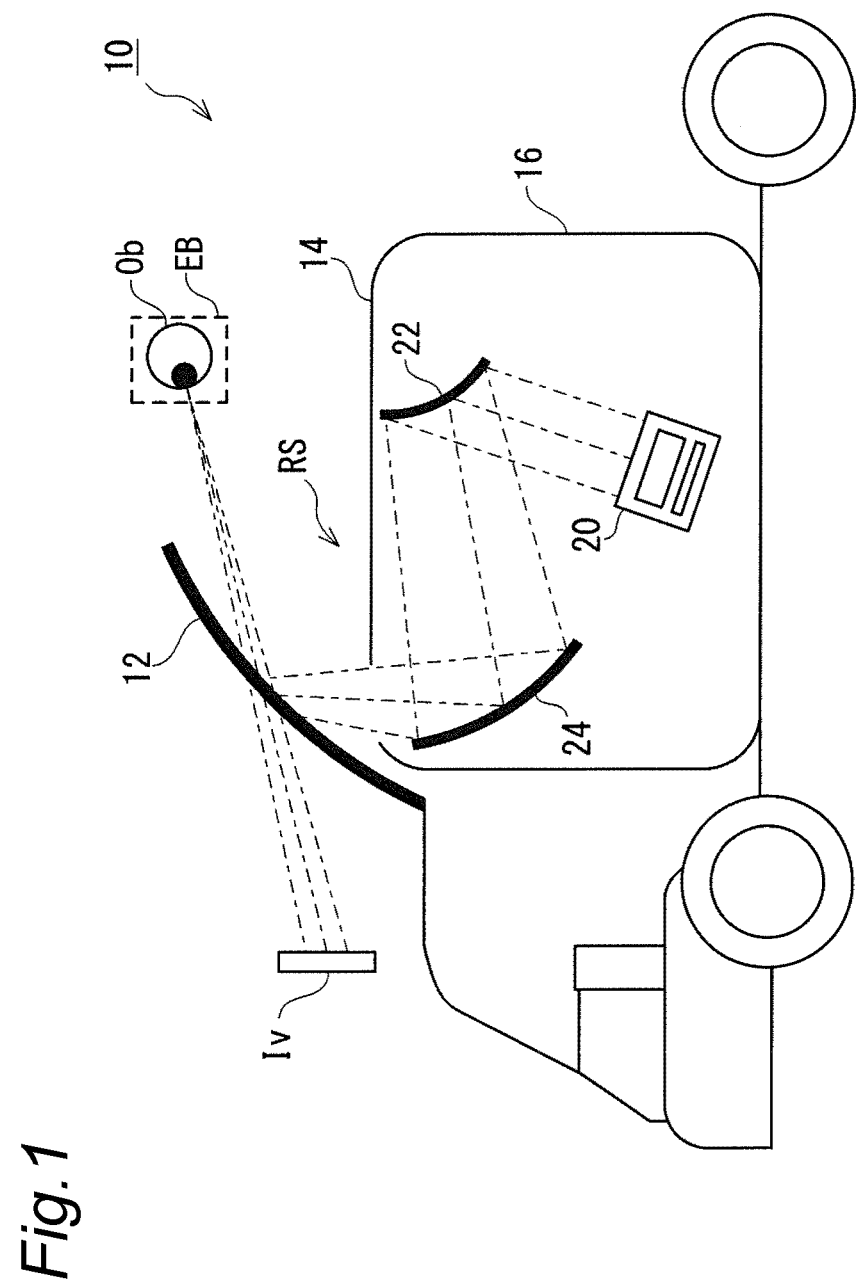
FIG. 1 is a schematic view of a vehicle equipped with a head-up display according to a first embodiment of the present disclosure.

FIG. 1 is a schematic view of a vehicle equipped with a head-up display according to a first embodiment of the present disclosure.

As shown in FIG. 1, a vehicle 10 is, for example, an automobile, and is equipped with a head-up display 14 that projects light (image) onto a transparent windshield 12.

The light (image) output from the head-up display 14 is guided through the windshield 12 into an eyebox EB of an observer Ob, such as a driver in the vehicle 10. In this manner, the observer Ob visually recognizes a virtual image Iv. That is, the observer Ob visually recognizes a landscape seen through the windshield 12 and the virtual image Iv that overlaps the landscape. Note that the eyebox EB is a spatial area in which the observer Ob can visually recognize a virtual image entirely.

The head-up display 14 has a casing 16. Inside the casing 16, a display device 20 and a plurality of mirrors 22 and 24 for guiding the light (image) output from the display device 20 to the windshield 12 are included. For example, a convex mirror 22 that reflects the light output from the display device 20 and a concave mirror 24 that reflects the light from the convex mirror 22 toward the windshield 12 are provided in the casing 16. The windshield 12 and a plurality of the mirrors 22 and 24 constitute a catoptric system RS that guides the light output from the display device 20 to the eyebox EB of the observer Ob. Note that the catoptric system RS from the display device 20 to the eyebox EB differs depending on a vehicle mounting condition of the head-up display 14.

Figure 2:
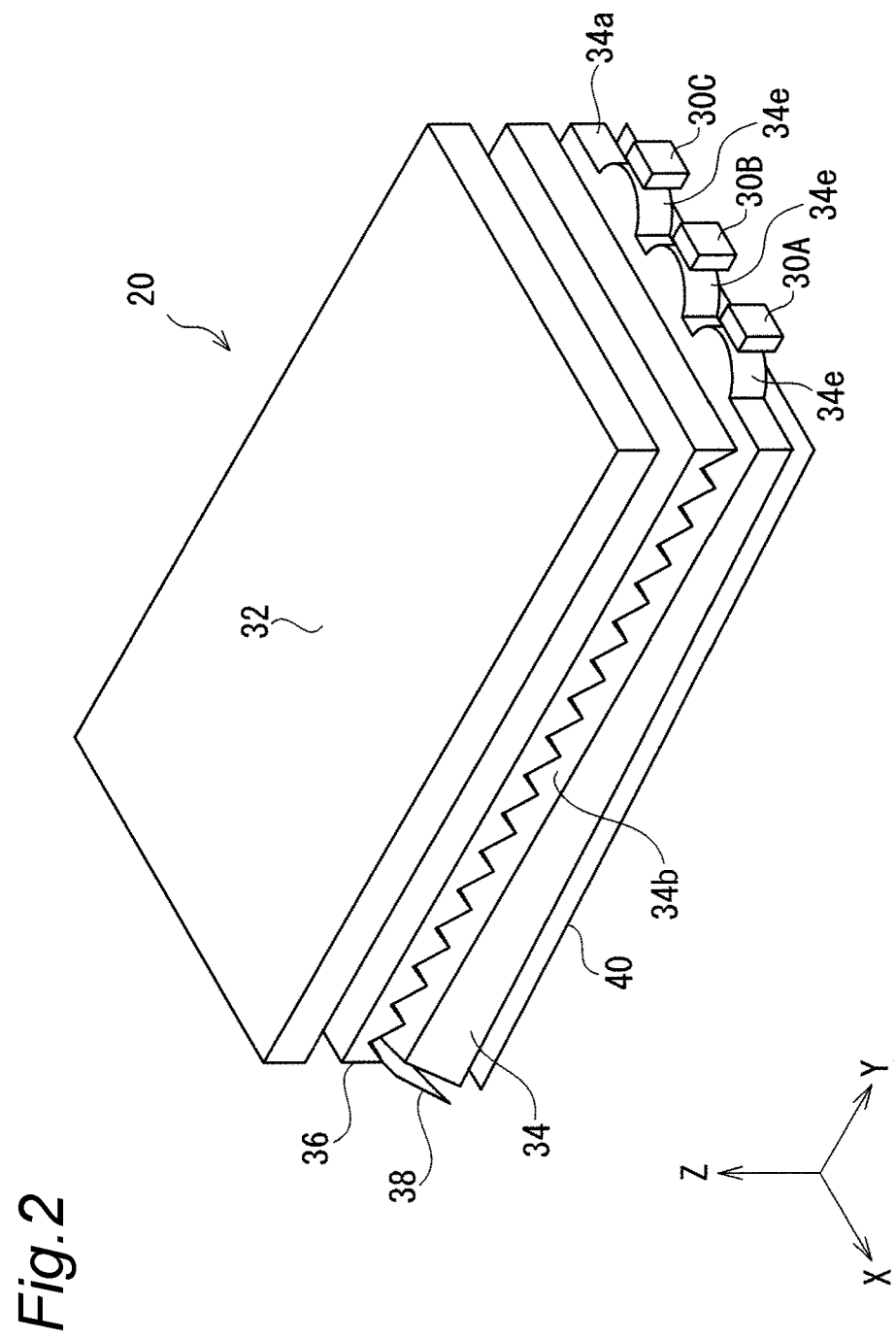
FIG. 2 is a perspective view of a display device according to the first embodiment.
Figure 3:
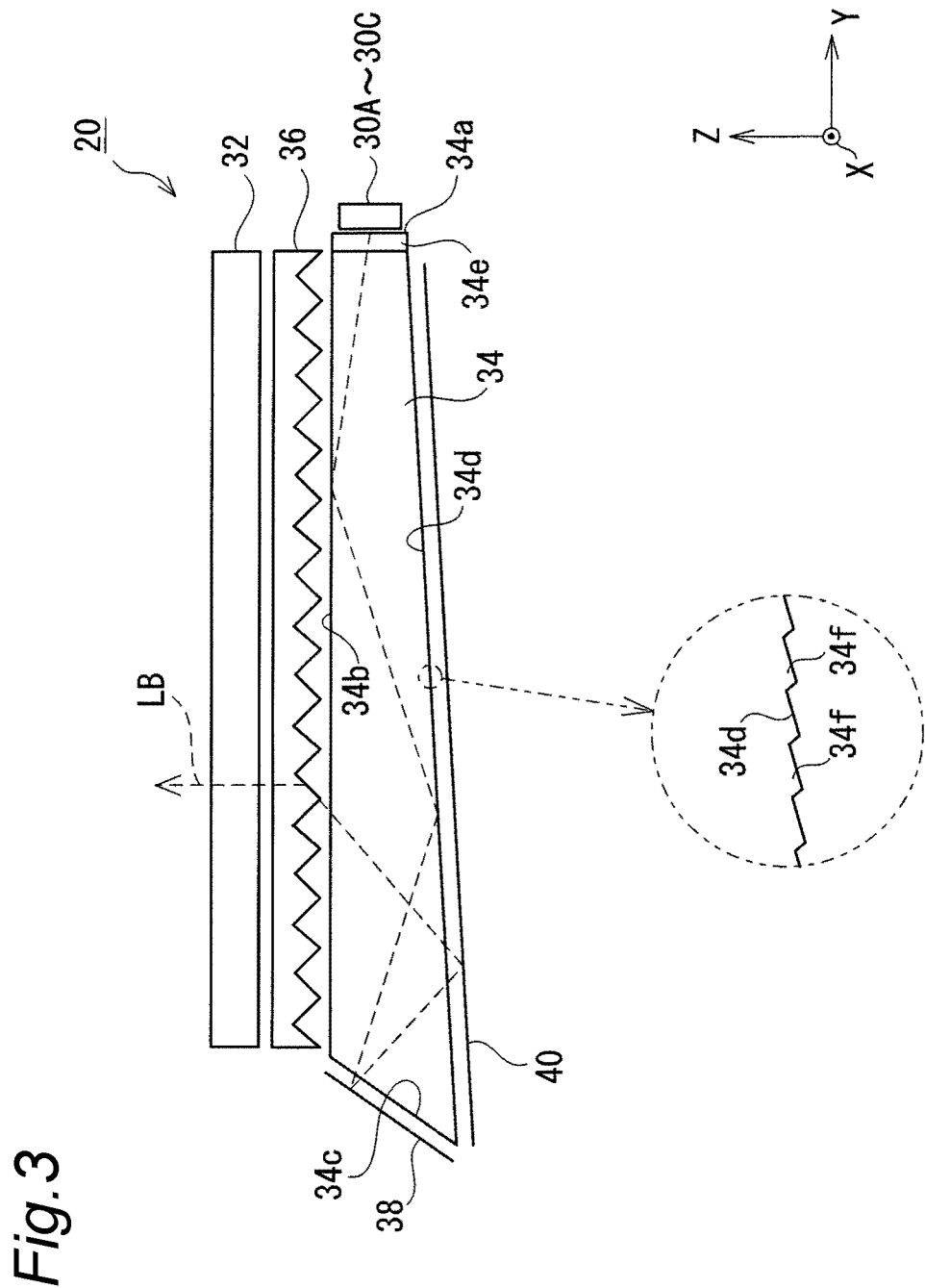
FIG. 3 is a cross-sectional view of the display device according to the first embodiment.

FIG. 2 is a perspective view of the display device according to the first embodiment. FIG. 3 is a cross-sectional view of the display device according to the first embodiment. Note that an XYZ coordinate system shown in the drawings is for facilitating understanding of the present disclosure, and not for limiting the present disclosure.

As shown in FIGS. 2 and 3, the display device 20 according to the first embodiment has a plurality of light sources 30A to 30C, a display panel 32 for displaying an image, and a light guide panel 34 that guides light emitted from the light sources 30A to 30C toward the display panel 32.

The light sources 30A to 30C are LEDs in the case of the present first embodiment. Note that the number of light sources is not limited to three, and may be one, two, or four or more depending on cases.

In the case of the present first embodiment, the display panel 32 is a transmissive liquid crystal panel. In the case of the present first embodiment, the display panel 32 has a rectangular shape having a longer direction (Y-axis direction) and a shorter direction (X-axis direction). That is, the display panel 32 displays an image having a longer direction and a shorter direction.

Figure 4A:
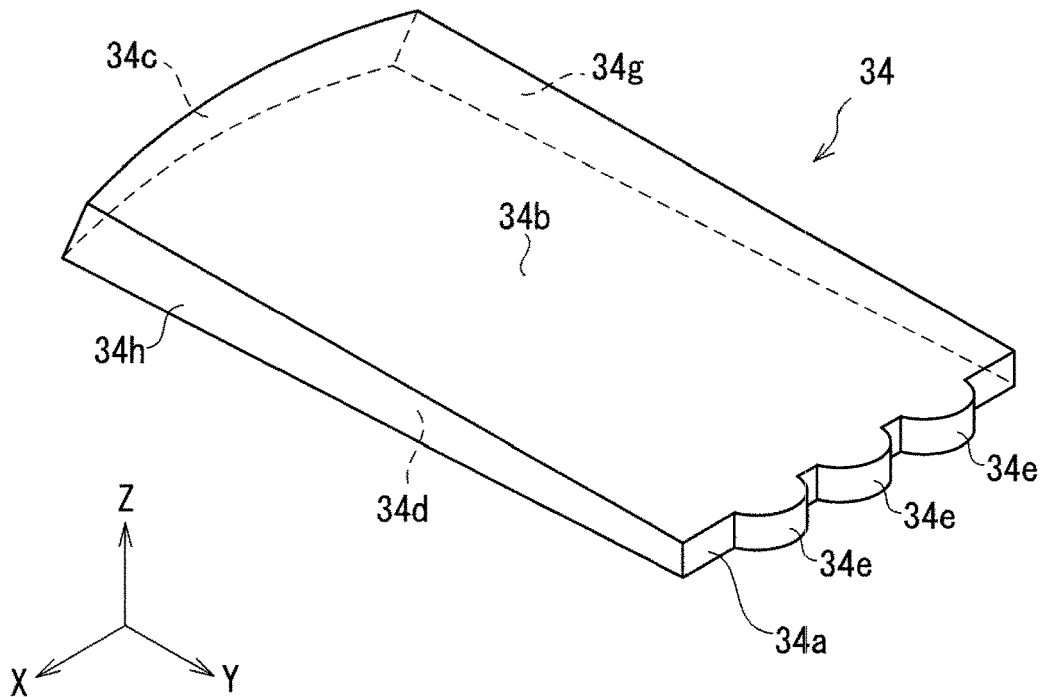
FIG. 4A is a front perspective view of the light guide panel.
Figure 4B:
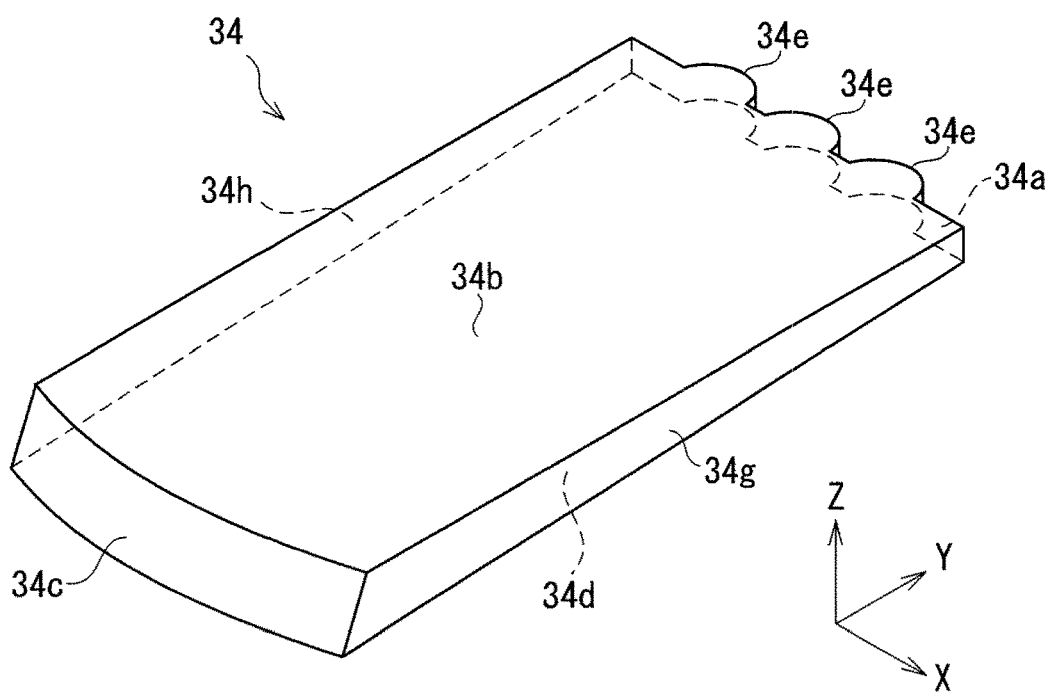
FIG. 4B is a rear perspective view of the light guide panel.

FIG. 4A is a front perspective view of the light guide panel. FIG. 4B is a rear perspective view of the light guide panel.

As shown in FIGS. 4A and 4B, the light guide panel 34 is a panel-shaped member made from a transparent material such as a resin material. Specifically, the light guide panel 34 includes an incident surface 34*a* facing the light sources 30A to 30C, an emission surface 34*b* facing the display panel 32, a first reflective surface 34*c* facing the incident surface 34*a*, and a second reflective surface 34*d* facing the emission surface 34*b*.

In the case of the present first embodiment, as shown in FIGS. 2 and 3, each of a plurality of the light sources 30A to 30C faces the incident surface 34*a* of the light guide panel 34 in the longer direction (Y-axis direction) of the display panel 32. Further, in a manner along the incident surface 34*a*, a plurality of the light sources 30A to 30C are arranged in the shorter direction (X-axis direction) of the display panel 32 which is a direction orthogonal to a facing direction (Z-axis direction) of the display panel 32 and the light guide panel 34. The light emitted from each of a plurality of the light sources 30A to 30C enters the light guide panel 34 through the incident surface 34*a*.

In the case of the present first embodiment, a cylindrical lens 34*e* is integrally provided on a portion of the incident surface 34*a* of the light guide panel 34 facing each of a plurality of the light sources 30A to 30C.

Each of the cylindrical lenses 34*e* has a curved surface that partially encloses a center line extending in the facing direction (Z-axis direction) of the display panel 32 and the light guide panel 34. The light sources 30A to 30C face this curved surface. When viewed in the facing direction (Z-axis direction) of the display panel 32 and the light guide panel 34, light emitted from each of the light sources 30A to 300 and incident on the cylindrical lens 34*e* while diverging is distributed at a narrow angle to the extent that the light is not reflected by side surface 34*g* or 34*h* of the light guide panel 34 by the cylindrical lens 34*e*.

The emission surface 34*b* of the light guide panel 34 is a surface facing the display panel 32. The light emitted from the emission surface 34*b* passes through the display panel 32 and finally reaches the eyebox EB of the observer Ob.

In the case of the present first embodiment, the display device 20 has an optical member 36 such as a prism sheet between the display panel 32 and the light guide panel 34. The optical member 36 changes the traveling direction of the light emitted from the emission surface 34*b* of the light guide panel 34 so that the light is directed toward the display panel 32. Specifically, the optical member 36 changes the traveling direction of the light emitted from the optical member 36 so as to make the traveling direction closer to the normal direction (Z-axis direction) of the display panel 32.

The first reflective surface 34*c* of the light guide panel 34 is a surface facing the incident surface 34*a* and reflects light in the light guide panel 34. That is, the first reflective surface 34*c* faces the light sources 30A to 30C with the incident surface 34*a* interposed between them. Further, a mirror 38 is provided so that light does not leak to the outside of the light guide panel 34 through the first reflective surface 34*c*. The mirror 38 is, for example, a specular reflection film provided on the outer side of the first reflective surface 34*c*. Note that further details of the first reflective surface 34*c* will be described later.

The second reflective surface 34*d* of the light guide panel 34 is a surface facing the emission surface 34*b* and reflects light in the light guide panel 34. In the case of the present first embodiment, as shown in FIG. 3, the second reflective surface 34d is a surface inclined with respect to the emission surface 34b for a reason described later. Specifically, the distance between the emission surface 34b and the second reflective surface 34d increases from the incident surface 34a toward the first reflective surface 34c.

Furthermore, in the case of the present first embodiment, the second reflective surface 34d of the light guide panel 34 is a prism surface composed of a plurality of prisms 34f. Due to this prism surface, the light reflected by the second reflective surface 34d and directed toward the emission surface 34b can be incident on the emission surface 34b at an incident angle smaller than a critical angle. As a result, the amount of light emitted from the emission surface 34b increases. Further, a mirror 40 is provided so that light does not leak to the outside of the light guide panel 34 through the second reflective surface 34d. The mirror 40 is, for example, a specular reflection film provided on the outer side of the second reflective surface 34d.

According to the light guide panel 34, as shown in FIG. 3, light (light ray) LB emitted from the light sources 30A to 30C enters the light guide panel 34 through the incident surface 34a, is reflected by any of the emission surface 34b, the first reflective surface 34c, and the second reflective surface 34d in the light guide panel 34, and finally is emitted to the outside of the light guide panel 34 through the emission surface 34b. The light emitted from the light guide panel 34 passes through the display panel 32 after the traveling direction is changed by the optical member 36.

From here, further details of the first reflective surface 34c; in the light guide panel 34 will be described.

Figure 5A:
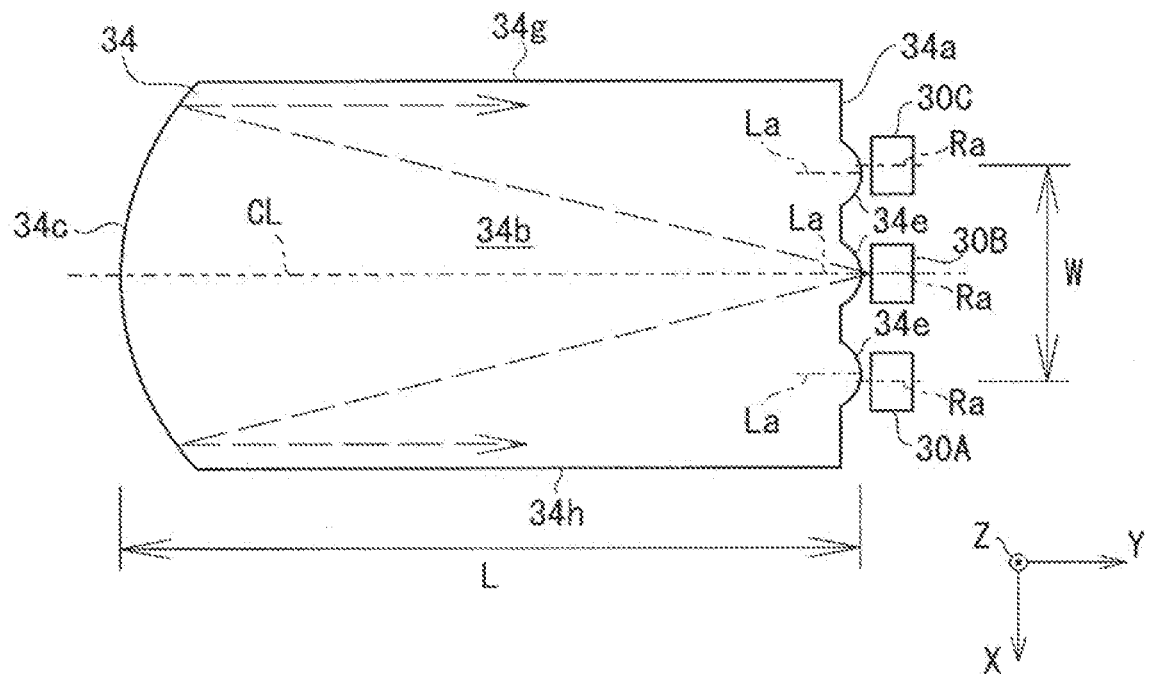
FIG. 5A is a top view of the light guide panel showing propagation in the light guide panel of light emitted from a light source at the center.
Figure 5B:
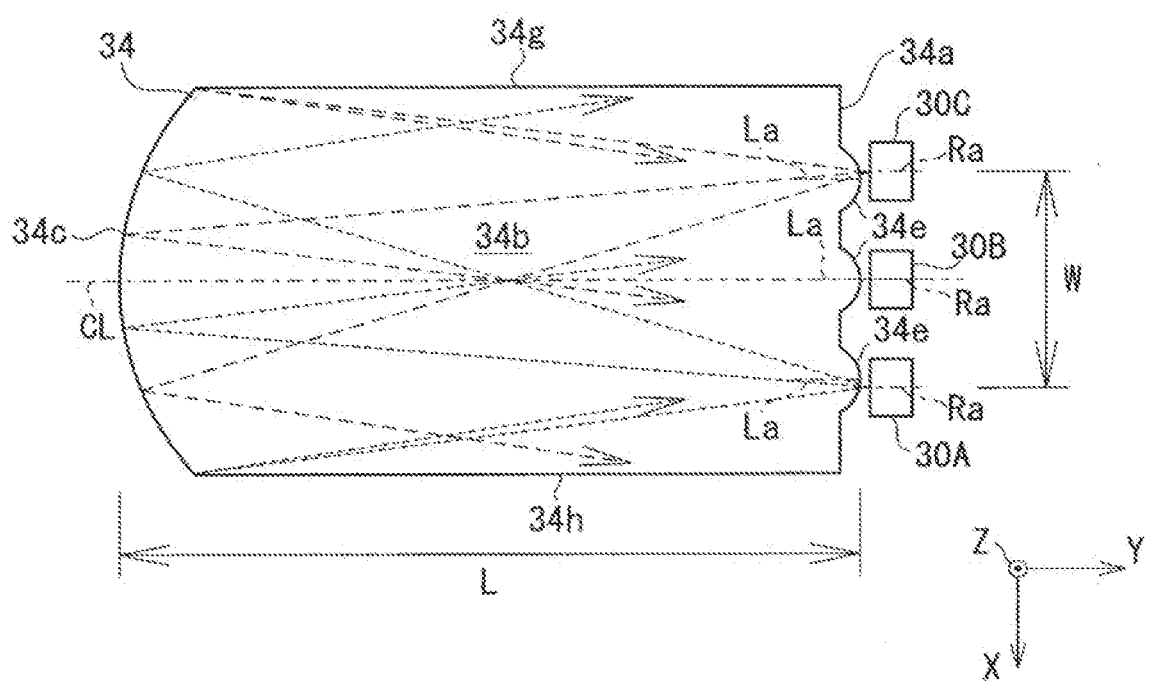
FIG. 5B is a top view of the light guide panel showing propagation in the light guide panel of light emitted from a light source on the outer side.

FIG. 5A is a top view of the light guide panel showing the propagation in the light guide panel of the light emitted from the light source 30B at the center. FIG. 5B is a top view of the light guide panel showing the propagation in the light guide panel of the light emitted from the light sources 30A and 30C on the outer side.

As shown in FIGS. 5A and 5B, the light (indicated by a plurality of different broken lines) emitted from the light sources 30A to 30C travels toward the first reflective surface 34c while diverging when viewed in the facing direction (Z-axis direction) of the display panel 32 and the light guide panel 34 in the light guide panel 34. The first reflective surface 34c has a concave shape when viewed in the facing direction (Z-axis direction) of the display panel 32 and the light guide panel 34. Specifically, the first reflective surface 34c has a concave shape that reflects light so that the reflected light becomes closer to parallel light. When viewed in the facing direction (Z-axis direction) of the display panel 32 and the light guide panel 34, the concave shape of the first reflective surface 34c preferably has a composite focal length with the cylindrical lens 34e that is almost the same as a Y-direction length L of a light guide plate.

As shown in FIGS. 5A and 5B, the reflected light of the first reflective surface 34c of each light source propagates in the light guide panel 34 in a state where divergence is suppressed when viewed in the facing direction (Z-axis direction) of the display panel 32 and the light guide panel 34, that is, as substantially parallel light. Then, as shown in FIG. 3, the light is reflected by the second reflective surface 34d and emitted from the emission surface 34b.

As shown in FIG. 3, in the case of the present first embodiment, the first reflective surface 34c is preferably inclined toward the second reflective surface 34d when viewed in the shorter direction (X-axis direction) of the display panel 32. That is, the first reflective surface 34c intersects the second reflective surface 34d at an angle smaller than 90 degrees.

In this case, a large portion of the reflected light of the first reflective surface 34c travels toward the second reflective surface 34d, and is reflected by the second reflective surface 34d toward the emission surface 34b. In this manner, as compared with the case where the first reflective surface 34c is not inclined toward the second reflective surface 34d, the reflected light of the first reflective surface 34c is emitted from the emission surface 34b efficiently, that is, by a small number of reflections. For this reason, the light is emitted from the emission surface 34b of the light guide panel 34 without being significantly attenuated in the light guide panel 34.

Further, as described above and as shown in FIG. 3, in the case of the present first embodiment, in the light guide panel 34, the distance between the emission surface 34b and the second reflective surface 34d is preferably increased from the incident surface 34a toward the first reflective surface 34c.

In this case, emission from the emission surface 34b of the light emitted from the light sources 30A to 30C without being reflected by the first reflective surface 34c, that is, without becoming substantially parallel light when viewed in the facing direction (Z-axis direction) of the display panel 32 and the light guide panel 34 is suppressed. Specifically, a part of the light emitted from the light sources 30A to 30C is not reflected by the second reflective surface 34d toward the emission surface 34b, and is reflected toward the first reflective surface 34c. In contrast, in a case where the distance between the emission surface 34b and the second reflective surface 34d decreases from the incident surface 34a toward the first reflective surface 34c, a part of the light emitted from the light sources 30A to 30C is reflected by the second reflective surface 34d toward the emission surface 34b.

Therefore, as the distance between the emission surface 34b and the second reflective surface 34d increases from the incident surface 34a toward the first reflective surface 34c, a large portion of the light emitted from the light sources 30A to 30C becomes substantially parallel light when viewed in the facing direction (Z-axis direction) of the display panel 32 and the light guide panel 34 by the first reflective surface 34c.

Furthermore, as shown in FIGS. 5A and 5B, in the case of the present first embodiment, the light sources 30A and 30C located on the outer side are preferably arranged so that a principal ray axis Ra of the light sources 30A and 30C is offset to the outer side with respect to an optical axis La of the corresponding cylindrical lens 34e when viewed in the facing direction (Z-axis direction) of the display panel 32 and the light guide panel 34.

As shown in FIG. 5A, the light source 30B located on a center line CL passing through the center of the incident surface 34a and the center of the first reflective surface 34c when viewed in the facing direction (Z-axis direction) of the display panel 32 and the light guide panel 34 is arranged so that the principal ray axis Ra of the light source 30B is aligned with the optical axis La of the corresponding cylindrical lens 34e. Note that the "principal ray axis" referred to here is an axis extending so as to coincide with an optical path of a light ray having the highest intensity.

Due to the arrangement of the light source 30B with respect to the cylindrical lens 34e, the light emitted from the light source 30B and passing through the corresponding cylindrical lens 34e travels toward the first reflective surface 34c in an extending direction (Y-axis direction) of the center line CL. That is, the light can reach the entire first reflective surface 34c without being reflected by the side surfaces 34g and 34h of the light guide panel 34. As a result, a large portion of the light of the light source 30B at the center becomes reflected light that is substantially parallel light when viewed in the facing direction (Z-axis direction) of the display panel 32 and the light guide panel 34 due to the first reflective surface 34c.

In contrast, as shown in FIG. 5B, the light sources 30A and 30C located off the center line CL of the light guide panel 34 are arranged so that the principal ray axis Ra of the light sources 30A and 30C is offset to the outer side with respect to the optical axis La of the corresponding cylindrical lens 34e when viewed in the facing direction (Z-axis direction) of the display panel 32 and the light guide panel 34. In this manner, the light emitted from the light sources 30A and 30C and passing through the corresponding cylindrical lens 34e propagates in the direction inclined inward with respect to the optical axis La of the corresponding cylindrical lens 34e. By the above, the light can reach the first reflective surface 34c without being reflected by the side surfaces 34g and 34h of the light guide panel 34. As a result, a large portion of the light of the light sources 30A and 30C on the outer side becomes reflected light that is substantially parallel light when viewed in the facing direction (Z-axis direction) of the display panel 32 and the light guide panel 34 due to the first reflective surface 34c. Note that, as shown in FIG. 5B, the principal ray axes of the reflected light of the first reflective surface 34c of the light sources 30A and 30C arranged line-symmetrically with respect to the center line CL preferably intersect on the center line CL of the display panel 32, in particular, at the center in the longer direction (Y-axis direction) of the light guide panel 32 on the center line CL.

Furthermore, the light guide panel 34 preferably emits light from the emission surface 34b of the light guide panel 34 so that the principal rays of the light sources 30A to 30C are incident on a central portion of the display panel 32. The shape of the light guide panel 34 for that purpose will be described with reference to FIG. 6.

Figure 6:
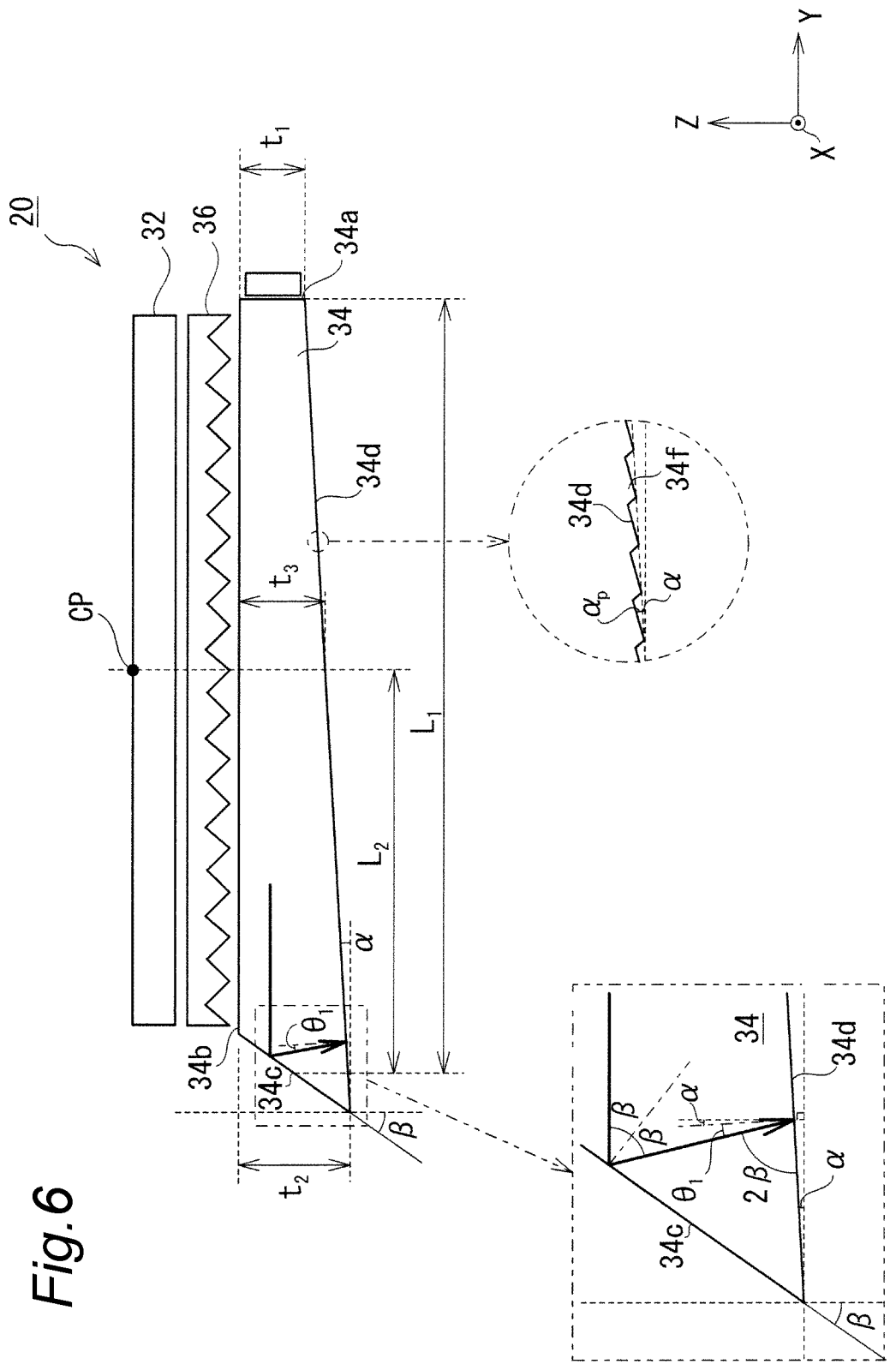
FIG. 6 is a diagram illustrating a shape parameter of the light guide panel.

FIG. 6 is a diagram illustrating a shape parameter of the light guide panel.

As shown in FIG. 6, in a case where an incident angle of the light first incident on the second reflective surface 34d after being reflected by the first reflective surface 34c of the light guide panel 34 is $\theta_1$, the incident angle $\theta_1$ can be expressed by Equation 1 below.

$$\theta_1 = 90 - \alpha - 2\beta \quad \text{Equation 1}$$

In Equation 1, as shown in FIG. 6, the parameter $\alpha$ is an inclination angle of the second reflective surface 34d with respect to an orthogonal direction (Y-axis direction) to the facing direction (Z-axis direction) of the display panel 32 and the light guide panel 34, that is, with respect to an orthogonal direction to the incident surface 34a. Further, as shown in FIG. 6, the parameter $\beta$ is an inclination angle of the first reflective surface 34c with respect to the facing direction (Z-axis direction) of the display panel 32 and the light guide panel 34, that is, with respect to the incident surface 34a.

Further, in a case where a minimum incident angle at which total reflection occurs in the light guide panel 34, that is, a seaside angle is $\theta_2$, the critical angle $\theta_2$ can be expressed by Equation 2 below.

$$\theta_2 = \sin^{-1}\frac{1}{n} \quad \text{Equation 2}$$

In Equation 2, the parameter n is a refractive index of the light guide panel 34.

Here, in order to extract a larger amount of light from the emission surface 34b of the light guide panel 34, the incident angle $\theta_1$ needs to be an angle at which total reflection occurs. That is, it is necessary to satisfy the condition shown by Equation 3 below.

$$\theta_1 = 90 - \alpha - 2\beta > \sin^{-1}\frac{1}{n} \quad \text{Equation 3}$$

By transforming Equation 3, the condition shown in Equation 4 below, which is a relational expression between the inclination angle $\beta$ of the first reflective surface 34c and the critical angle $\theta_2$, can be obtained.

$$\beta < 45 - \frac{\alpha}{2} - \frac{\theta_2}{2} \quad \text{Equation 4}$$

Further, the reflected light of the first reflective surface 34c propagates in the Y-axis direction in the light guide panel 34 while being totally reflected by the emission surface 34b and the second reflective surface 34d. Equation 5 which is a condition for light to be emitted from the emission surface 34b without the light reaching the incident surface 34a is shown below.

$$N \times d < L_1 \quad \text{Equation 5}$$

In Equation 5, the parameter N is the number of times light being reflected until the light is emitted from the light guide panel 34 after being reflected by the first reflective surface 34c. Further, the parameter d is a distance (propagation distance in the Y-axis direction per reflection), through which light propagates after one reflection until the next reflection, in the orthogonal direction (Y-axis direction) to the facing direction (Z-axis direction) of the display panel 32 and the light guide panel 34. Furthermore, the parameter $L_1$ is, as shown in FIG. 6, the length of the light guide panel in the orthogonal direction (Y-axis direction) to the facing direction (Z axis direction) of the display panel 32 and the light guide panel 34.

The number N of reflections can be calculated using Equation 6 below.

$$N = \frac{\theta_1 - \theta_2}{\alpha} \quad \text{Equation 6}$$

When light is reflected by the second reflective surface 34d, an angle change of the light of $+2\alpha$ occurs, and when light is reflected by the emission surface 34b, an angle change of the light of $\pm 0$ occurs. Therefore, when light is reflected once, an angle change of the light of $+\alpha$ can be considered to occur. For this reason, as shown in Equation 6, if the value calculated by subtracting the critical angle $\theta_2$ from the initial incident angle $\theta_1$ is divided by $\alpha$, the number N of reflections until the incident angle reaches the critical angle $\theta_2$, that is, until light is emitted from the light guide panel 34 can be obtained.

Note that, in the case of the present first embodiment, a plurality of the prisms 34f are provided on the second reflective surface 34d. Considering the prism 34f, in a case where a rising angle of the prism 34f with respect to the second reflective surface 34d is α_p, Equation 6 is replaced by Equation 7.

$$N = \frac{\theta_1 - \theta_2}{\alpha + \alpha_P} \qquad \text{Equation 7}$$

The propagation distance d per reflection in Equation 5 can be calculated by Equation 8 below.

$$d = \frac{t_1 + t_2}{2} \times \tan\frac{\theta_1 + \theta_2}{2} \qquad \text{Equation 8}$$

In Equation 8, $(t_1+t_2)/2$ in the first term on the right side indicates an average thickness (size in the facing direction (Z-axis direction) of the display panel 32 and the light guide panel 34) of the entire light guide panel 34. Specifically, $t_1$ is the thickness of the light guide panel 34 at the incident surface 34a, and $t_2$ is the thickness of the light guide panel 34 at the first reflective surface 34c.

In a case where the product of the number N of reflections until the incident angle becomes the critical angle $\theta_2$ calculated by Equation 7 and the propagation distance d per reflection calculated by Equation 8 is smaller than the length $L_1$ of the light guide panel as shown in Equation 5, light is emitted from the light guide panel 34 after being reflected by the first reflective surface 34c.

Note that, by substituting Equations 7 and 8 into Equation 5, Equation 5 can be rewritten as Equation 9 below.

$$\frac{t_1 + t_2}{2} \times \tan\frac{\theta_1 + \theta_2}{2} \times \frac{\theta_1 - \theta_2}{\alpha} < L_1 \qquad \text{Equation 9}$$

Next, Equation 10, which is a condition that the principal ray of the light sources 30A to 30C is emitted from the emission surface 34b without reaching the incident surface 34a after being reflected by the first reflective surface 34c, in particular, a condition that the emitted light from the emission surface 34b passes through a central portion of the display panel 32 is shown below.

$$½ \times L_2 < N' \times d' < ³⁄₂ \times L_2 \qquad \text{Equation 10}$$

In Equation 10, the parameter N' is the number of reflections until the incident angle of light reflected by the first reflective surface 34c becomes the critical angle θ2. Further, the parameter d' is a distance (propagation distance per reflection), through which light propagates after one reflection until the next reflection, in the orthogonal direction (Y-axis direction) to the facing direction (Z-axis direction) of the display panel 32 and the light guide panel 34 regarding the light reflected by the first reflective surface 34c. Then, as shown in FIG. 6, the parameter $L_2$ is a distance in the Y-axis direction between the position of the light guide panel 34 corresponding to the center (center point CP) in the Y-axis direction of the display panel 32 and the first reflective surface 34c.

The number N' of reflections in Equation 10 is the same as that in Equation 6 as shown in Equation 11 below.

$$N' = N = \frac{\theta_1 - \theta_2}{\alpha} \qquad \text{Equation 11}$$

The propagation distance d' per reflection in Equation 10 can be calculated by Equation 12 below.

$$d' = \frac{t_2 + t_3}{2} \times \tan\frac{\theta_1 + \theta_2}{2} \qquad \text{Equation 12}$$

In Equation 12, $(t_2+t_3)/2$ of the first term on the right side indicates the average thickness (size in the facing direction (Z-axis direction) of the display panel 32 and the light guide panel 34) of the light guide panel 34 between the position of the light guide panel 34 corresponding to the center (center point CP) in the Y-axis direction of the display panel 32 and the first reflective surface 34c. Specifically, $t_2$ is the thickness of the light guide panel 34 at the first reflective surface 34c, and $t_3$ is the thickness of the light guide panel 34 at the position of the light guide panel 34 corresponding to the center (center point CP) in the Y-axis direction of the display panel 32.

In a case where the product of the number N' of reflections until the incident angle becomes the critical angle $\theta_2$ calculated by Equation 11 and the propagation distance d' per reflection calculated by Equation 12 is within the range of ½ to ³⁄₂ times the length $L_2$ of the light guide panel as shown in Equation 10, light reflected by the first reflective surface 34c can pass through the center portion of the display panel 32.

Note that, by substituting Equations 11 and 12 into Equation 10, Equation 10 can be rewritten as Equation 13 below.

$$\frac{1}{2} \times L_2 < \frac{t_2 + t_3}{2} \times \tan\frac{\theta_1 + \theta_2}{2} \times \frac{\theta_1 - \theta_2}{\alpha} < \frac{3}{2} \times L_2 \qquad \text{Equation 13}$$

Therefore, as shown in FIG. 6, if the parameters α, β, L1, and L2 indicating the shape of the light guide panel 34 are set so as to satisfy Equations 1, 2, 4, 9, and 13, the light guide panel 34 can emit light from the emission surface 34b in a manner that a larger portion of light passes through the central portion of the display panel 32.

According to the display device 20 according to the present first embodiment, a high-brightness image can be output. This will be specifically described.

Figure 7:
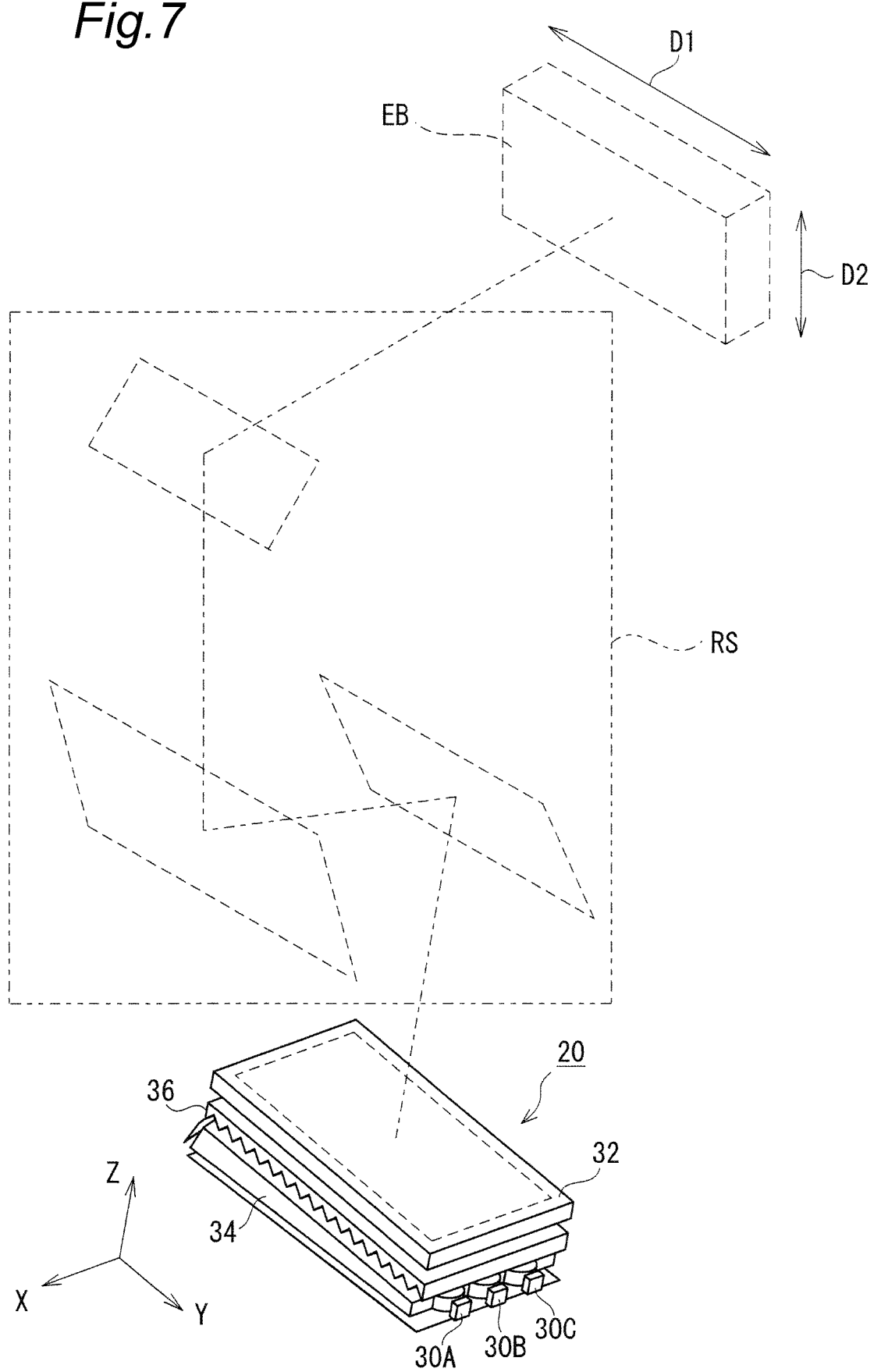
FIG. 7 is a diagram illustrating a positional relationship between the display device according to the first embodiment and the eyebox of the observer.

FIG. 7 is a diagram illustrating a positional relationship between the display device according to the first embodiment and the eyebox of the observer.

As shown in FIGS. 1 and 7, in the case of the present first embodiment, light (image) output from the display device 20 is guided to the eyebox EB of the observer Ob through the catoptric system RS.

As shown in FIG. 7, in the case of the present first embodiment, the eyebox EB of the observer Ob in the vehicle 10 is a region in which a left-right direction D1 is long and an up-down direction D2 is short. Note that the left-right direction and the up-down direction are directions based on the observer Ob. In the case of the present first embodiment, the left-right direction D1 substantially corresponds to the vehicle width direction of the vehicle 10, and the up-down direction D2 substantially corresponds to the height direction of the vehicle 10. Further, as shown in FIG. 7, the head-up display 14 is mounted on the vehicle 10 so that the shorter direction (X-axis direction) of the display panel 32 in the display device 20 corresponds to the up-down direction D2 of the eyebox EB.

As described above, and as shown in FIGS. 5A and 5B, the light that propagates in the light guide panel 34 and is substantially parallel light when viewed in the facing direction (Z-axis direction) of the display panel 32 and the light guide panel 34 by being reflected by the first reflective surface 34c is emitted from the light guide panel 34 toward the display panel 32 in the state of being substantially parallel light. As a result, the light in a state in which the divergence in the shorter direction (X-axis direction) of the display panel 32 is suppressed is output from the display device 20. In this manner, passing of a part of the light above and below the eyebox EB of the observer Ob is suppressed, and the amount of light reaching the eyebox EB increases. As a result, the amount of light output from the display device increases, and the brightness of the image on the windshield 12 increases.

Note that, as shown in FIG. 7, in a case where the head-up display 14 is arranged with respect to the eyebox EB in a manner that the up-down direction D2 of the eyebox EB of the observer Ob corresponds to the shorter direction (X-axis direction) of the display panel 32, the light guide panel 34 is made to satisfy, for example, the inequality below.

$$S(d2) < \tan^{-1} \frac{W}{1.5 \times L} \quad \text{Equation 14}$$

Note that, in Equation 14, S(d2) is the size in the up-down direction D2 of the eyebox EB. L is the length of the light guide panel 34 in the longer direction (Y-axis direction) of the display panel 32 as shown in FIGS. 5A and 5B, and W is the distance between the light sources 30A and 30C located at the outermost positions.

According to the present first embodiment described above, a high-brightness image can be output, for example, from a display device mounted on a head-up display of a vehicle.

Second Embodiment

A second embodiment is different from the first embodiment described above with respect to the light guide panel in the display device. Therefore, the different light guide panel of the display device according to the present second embodiment will be described.

Figure 8:
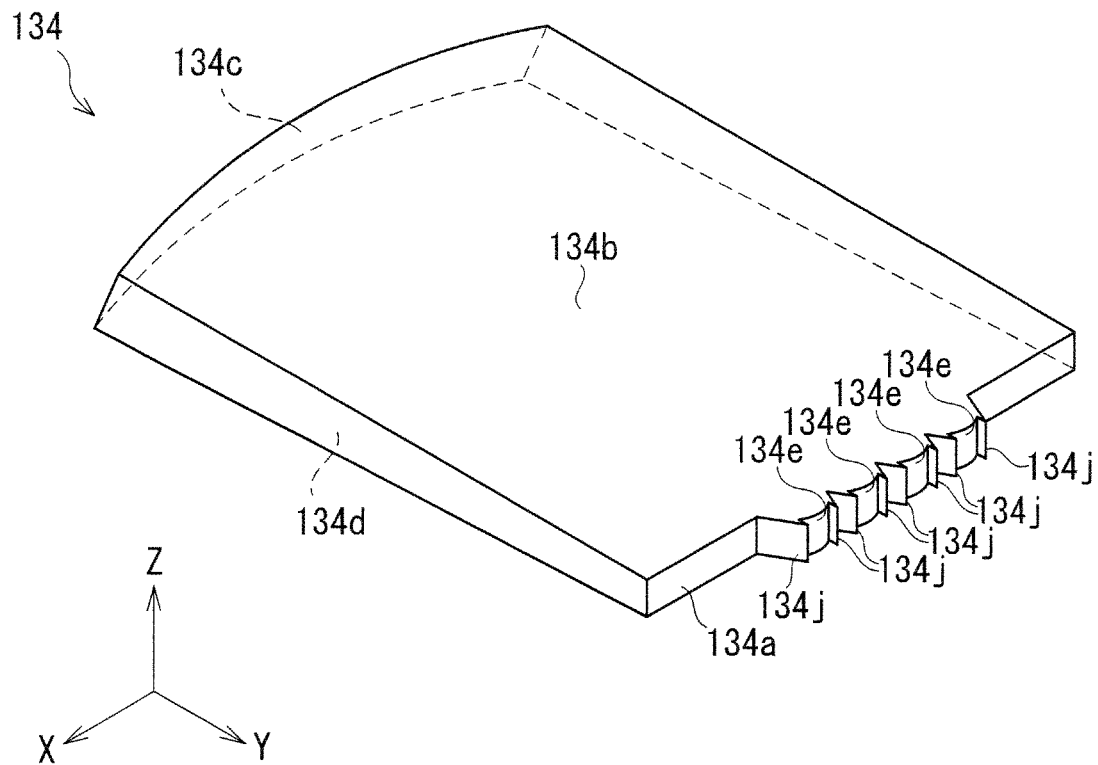
FIG. 8 is a perspective view of the light guide panel in the display device according to a second embodiment of the present disclosure.
Figure 9:
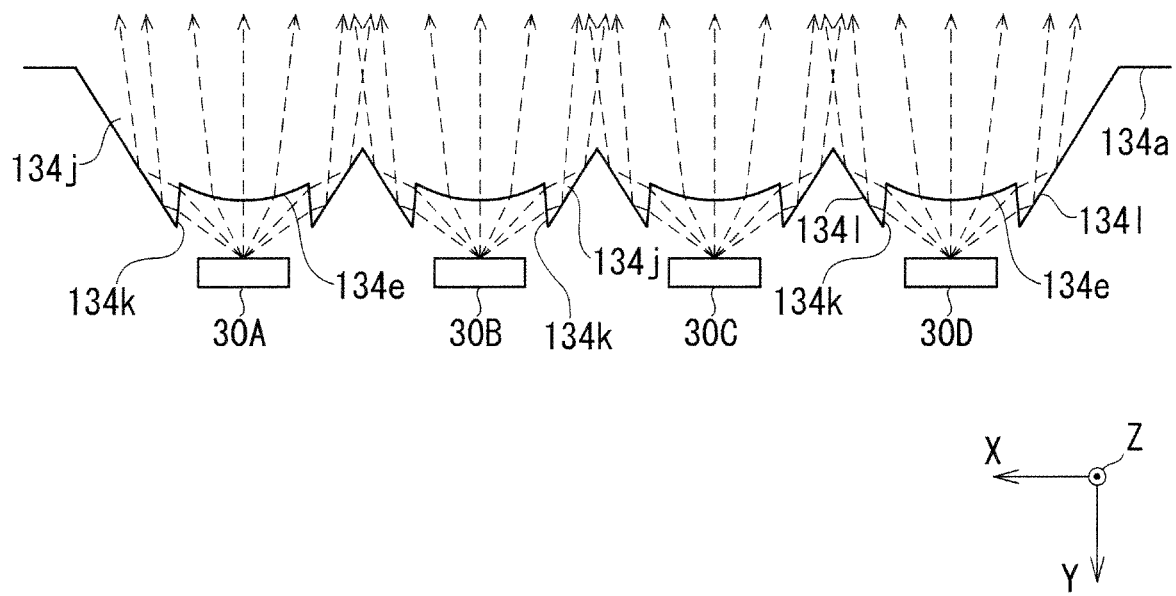
FIG. 9 is a top view of the light guide panel showing an incident surface of the light guide panel according to the second embodiment.

FIG. 8 is a perspective view of the light guide panel in the display device according to the second embodiment of the present disclosure. FIG. 9 is a top view of the light guide panel showing an incident surface of the light guide panel according to the second embodiment.

As shown in FIGS. 8 and 9, a light guide panel 134 of the display device according to the present second embodiment includes a plurality of cylindrical lenses 134e on an incident surface 134a of the light guide panel 134, as in the first embodiment described above. Further, for each of the cylindrical lenses 134e, a pair of prisms 134j arranged so as to sandwich the cylindrical lens 134e are provided. Each of the prisms 134j has a light intake surface 134k and a reflective surface 134I.

Light emitted from the light sources 30A to 30D at an angle at which the light cannot be incident on the cylindrical lens 134e is taken into the light guide panel 134 via the light intake surface 134k of the prism 134j, and is reflected by the reflective surface 134I in the longer direction (Y-axis direction) of the display panel 32. In this manner, most of the light emitted from a plurality of the light sources 30A to 30D is taken into the light guide panel 134. As a result, the display device can output a higher-brightness image.

Although the display device of the present disclosure, the head-up display including the display device, and the vehicle including the head-up display are described above with reference to a plurality of the embodiments described above, embodiments of the present disclosure are not limited to this.

For example, in the case of the first embodiment described above, as shown in FIGS. 5A and 5B, a plurality of the cylindrical lenses 34e corresponding to a plurality of the light sources 30A to 30C are provided on the incident surface 34a of the light guide panel 34. However, the embodiment of the present disclosure is not limited to this.

In the case of a light source that distributes light at a narrow angle, even if the cylindrical lens is not provided on the incident surface of the light guide panel, a large portion of the light emitted from the light source can reach the first reflective surface without being reflected by the side surface of the light guide panel.

Further, in the case of the first embodiment described above, as shown in FIG. 3, the optical member 36 such as a prism sheet that changes the traveling direction of light emitted from the emission surface 34b of the light guide panel 34 so that the light is directed to the display panel 32 is arranged between the display panel 32 and the light guide panel 34. However, the embodiment of the present disclosure is not limited to this.

For example, by appropriately optically designing the second reflective surface 34d, the second reflective surface 34d may reflect light toward the emission surface 34b in a direction close to the normal direction of the display panel 32. In this manner, it is not necessary to arrange the optical member 36 that changes the traveling direction of the light emitted from the light guide panel 34 between the display panel 32 and the light guide panel 34.

The above embodiment describes the case where the moving body is the vehicle 10 such as an automobile. However, the moving body is not limited to the vehicle 10. The moving body may be a vehicle on which a person rides, and may be, for example, an airplane or a ship. The moving body may be an unmanned aerial vehicle. The moving body may be one that vibrates instead of one that travels.

As described above, a plurality of the embodiments are described as examples of the technique in the present disclosure. For that purpose, the accompanying drawings and the detailed description are provided.

Accordingly, the constituents described in the accompanying drawings and the detailed description may include not only a constituent essential for solving the problem, but also a constituent not essential for solving the problem in order to exemplify the technique. For this reason, the non-essential constituents are not to be immediately recognized as essential just because the non-essential constituents are described in the accompanying drawings and the detailed description.

Further, since the above-described embodiment is for exemplifying the technique in the present disclosure, various changes, substitutions, additions, omissions, and the like can be made within the scope of claims or a scope equivalent to the claims.

The invention claimed is:

1. A display device comprising:
a light source that emits light;
a display panel that displays an image; and
a light guide panel that guides light emitted from the light source to the display panel, wherein the light guide panel includes an incident surface facing the light source, an emission surface facing the display panel, a first reflective surface facing the incident surface, and a second reflective surface facing the emission surface, the first reflective surface has a concave shape that reflects light so that reflected light becomes closer to parallel light when viewed in a facing direction of the display panel and the light guide panel in the light guide panel, is tilted at an angle larger than 0 degrees with respect to the incident surface, and intersects the second reflective surface at an angle smaller than 90 degrees, and the light guide panel reflects a light first incident on the second reflective surface at an incident angle $\theta 1$ after being reflected by the first reflective surface such that the incident angle $\theta 1$ is larger than a critical angle $\theta 2$ which is a minimum angle at which total reflection occurs in the light guide panel and such that the light is reflected multiple times based on a difference between the incident angle $\theta 1$ and the critical angle $\theta 2$ and an inclination angle $\alpha$ of the second reflective surface with respect to an orthogonal direction to the incident surface until the light is emitted from the light guide panel.

2. The display device according to claim 1 that satisfies following Equations in a case where a refractive index of the light guide panel is n, an inclination angle of the first reflective surface with respect to the incident surface is $\beta$, a thickness of the light guide panel in the facing direction at the incident surface is $t_1$, a thickness of the light guide panel in the facing direction at the first reflective surface is $t_2$, a thickness of the light guide panel at a position corresponding to a center in the orthogonal direction of the display panel is $t_3$, a length of the light guide panel in the orthogonal direction is $L_1$, and a distance between a position of the light guide panel corresponding to a center in the orthogonal direction of the display panel and the first reflective surface is $L_2$ $$\theta_1 = 90 - \alpha - 2\beta \quad \text{[Equation 1]}$$

$$\theta_2 = \sin^{-1}\frac{1}{n} \quad \text{[Equation 2]}$$

$$\beta < 45 - \frac{\alpha}{2} - \frac{\theta_2}{2} \quad \text{[Equation 3]}$$

$$\frac{t_1 + t_2}{2} \times \tan\frac{\theta_1 + \theta_2}{2} \times \frac{\theta_1 - \theta_2}{\alpha} < L_1 \quad \text{[Equation 4]}$$

$$\frac{1}{2} \times L_2 < \frac{t_2 + t_3}{2} \times \tan\frac{\theta_1 + \theta_2}{2} \times \frac{\theta_1 - \theta_2}{\alpha} < \frac{3}{2} \times L_2. \quad \text{[Equation 5]}$$

3. The display device according to claim 1, wherein a distance between the emission surface and the second reflective surface increases from the incident surface toward the first reflective surface.

4. The display device according to claim 1, wherein the light sources are a plurality of light sources and are arranged along the incident surface.

5. The display device according to claim 4, wherein a cylindrical lens that distributes, at a narrow angle, light emitted from the light source when viewed in the facing direction is provided in a plurality of portions of the incident surface facing each of the plurality of light sources.

6. The display device according to claim 5, wherein the light source that is located off a center line passing through a center of the incident surface and a center of the first reflective surface when viewed in the facing direction is arranged so that a principal ray axis of the light source is offset to an outer side with respect to an optical axis of a corresponding cylindrical lens.

7. The display device according to claim 6, wherein the light source is arranged offset so that principal ray axes of reflected light of the first reflective surfaces of light sources arranged line-symmetrically with respect to the center line intersect at a center in a facing direction of the light source and the incident surface on the center line.

8. The display device according to claim 7, wherein a composite focal length of the cylindrical lens and the concave shape of the first reflective surface of the light guide panel is almost the same as a length in a light guide direction of the light guide plate.

9. The display device according to claim 8, further comprising a pair of prisms arranged so as to sandwich the cylindrical lens, wherein the pair of prisms have a light intake surface through which light emitted from the light source is taken into the light guide panel.

10. A head-up display having the display device according to claim 1.

11. The head-up display according to claim 10 that satisfies following Equation, where size in an up-down direction of an eyebox is S(d2), a length in a longer direction of the display panel of the light guide panel is L, and a distance between light sources located at outermost positions is W $$S(d2) < \tan^{-1}\frac{W}{1.5 \times L}. \quad \text{[Equation 6]}$$

12. A moving body comprising:

the head-up display according to claim 10; and a windshield on which an image output from the head-up display is projected.

13. A light guide panel that guides light emitted from a light source to a display panel, the light guide panel comprising:

an incident surface facing the light source;

an emission surface facing the display panel;

a first reflective surface facing the incident surface; and a second reflective surface facing the emission surface, wherein the first reflective surface has a concave shape that reflects light so that reflected light becomes closer to parallel light when viewed in a facing direction of the display panel and the light guide panel in the light guide panel, is tilted at an angle larger than 0 degrees with respect to the incident surface, and intersects the second reflective surface at an angle smaller than 90 degrees, an incident angle $\theta 1$ of a light first incident on the second reflective surface after being reflected by the first reflective surface is larger than a critical angle $\theta 2$ which is a minimum angle at which total reflection occurs in the light guide panel, and the light is reflected multiple times based on a difference between the incident angle $\theta 1$ and the critical angle $\theta 2$ and an inclination angle $\alpha$ of the second reflective surface with respect to an orthogonal direction to the incident surface until the light is emitted from the light guide panel.

14. A display device comprising:
a light source that emits light;
a display panel that displays an image; and
a light guide panel that guides light emitted from the light source to the display panel, wherein
the light guide panel includes an incident surface facing the light source, an emission surface facing the display panel, a first reflective surface facing the incident surface, and a second reflective surface facing the emission surface,
the first reflective surface has a concave shape that reflects light so that reflected light becomes closer to parallel light when viewed in a facing direction of the display panel and the light guide panel in the light guide panel, is tilted at an angle larger than 0 degrees with respect to the incident surface, and intersects the second reflective surface at an angle smaller than 90 degrees,
a cylindrical lens is provided on the incident surface facing the light sources and distributes, at a narrow angle, light emitted from the light source when viewed in the facing direction, and
a pair of prisms are arranged so as to sandwich the cylindrical lens and have a light intake surface through which light emitted from the light source is taken into the light guide panel.

15. A head-up display having a display device, the display device comprising:
a light source that emits light;
a display panel that displays an image; and
a light guide panel that guides light emitted from the light source to the display panel, wherein
the light guide panel includes an incident surface facing the light source, an emission surface facing the display panel, a first reflective surface facing the incident surface, and a second reflective surface facing the emission surface,
the first reflective surface has a concave shape that reflects light so that reflected light becomes closer to parallel light when viewed in a facing direction of the display panel and the light guide panel in the light guide panel, is tilted at an angle larger than 0 degrees with respect to the incident surface, and intersects the second reflective surface at an angle smaller than 90 degrees, and
the head-up display satisfies following Equation, where size in an up-down direction of an eyebox is S(d2), a length in a longer direction of the display panel of the light guide panel is L, and a distance between light sources located at outermost positions is W $$S(d2) < \tan^{-1} \frac{W}{1.5 \times L}. \qquad \text{[Equation 7]}$$

* * * * *